US008494143B2

(12) United States Patent
DeJana et al.

(10) Patent No.: US 8,494,143 B2
(45) Date of Patent: Jul. 23, 2013

(54) TELECONFERENCE PRESENTATION RETRIEVAL MANAGEMENT

(75) Inventors: Ryan G. DeJana, Longmont, CO (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/277,304

(22) Filed: Oct. 20, 2011

(65) Prior Publication Data

US 2013/0101107 A1    Apr. 25, 2013

(51) Int. Cl.
*H04M 3/42* (2006.01)
*H04M 3/00* (2006.01)
*H04M 5/00* (2006.01)

(52) U.S. Cl.
USPC ............ 379/204.01; 379/201.01; 379/202.01; 379/265.09

(58) Field of Classification Search
USPC ............ 379/204.01, 201.01, 202.01, 203.01, 379/207.07, 265.09; 709/203, 204
See application file for complete search history.

(56) References Cited

U.S. PATENT DOCUMENTS

| | | | |
|---|---|---|---|
| 6,870,916 B2 * | 3/2005 | Henrikson et al. | 379/202.01 |
| 7,096,037 B2 | 8/2006 | Canova, Jr. et al. | |
| 7,379,733 B2 | 5/2008 | Maes et al. | |
| 7,877,443 B2 | 1/2011 | Lyle et al. | |
| 2006/0285670 A1 * | 12/2006 | Chin et al. | 379/201.01 |
| 2008/0239994 A1 | 10/2008 | Xiong et al. | |
| 2009/0310770 A1 | 12/2009 | Longobardi et al. | |
| 2011/0138014 A1 | 6/2011 | Arnett et al. | |
| 2012/0278381 A1 * | 11/2012 | Ferlitsch et al. | 709/203 |

* cited by examiner

*Primary Examiner* — Thjuan K Addy
(74) *Attorney, Agent, or Firm* — Matthew F. Mottice; Arthur Samodovitz

(57) ABSTRACT

A system, method and program product for delivering to an invitee of a teleconference an electronic file attached to or referenced by a meeting notice for the teleconference. The teleconference hosted by a server computer, the invitee has a telephone to call-in to the teleconference via a telephone connection, and an invitee computer downloads the electronic file from the server computer via a first network in response to selection by the invitee of a representation of the electronic file from the meeting notice. The server computer receives a notification that a predetermined combination of keys has been pressed by the invitee on the telephone. In response, the server computer determines an e-mail address or instant message address for the invitee. The server computer attaches and sends the electronic file to an e-mail or instant message with the attached electronic file to the e-mail address or instant message address.

18 Claims, 5 Drawing Sheets

TELECONFERENCE PRESENTATION RETRIEVAL MANAGEMENT

FIELD OF THE INVENTION

The present invention relates generally to teleconferencing and more specifically to delivery of presentation materials to invitees of a teleconference.

BACKGROUND OF THE INVENTION

Teleconference meetings through the use of a telephone and a computing device are common today. In a known audio/visual teleconference meeting, a host of the meeting posts documents in a meeting notice, generated at a host's server computer, and allows the invitees to download the documents to their computer and page through the documents at will. A known Lotus™ Notes program can be used to schedule an audio/visual teleconference meetings, identify the call-in telephone number, designate and notify the invitees and post the documents. In response to the scheduling of the meeting, the Lotus™ Notes program sends meeting notices to the invitees, activates the call-in telephone number, and makes the posted documents available for download to the invitees. The invitees open the meeting notice and "click-on" an icon for the posted documents. These documents provide pertinent information to the invitees as well as allow the invitees to follow along with the presentation during the conference call. At the date and time scheduled for the meeting, each invitee calls-in to a shared telephone number through a telephone for oral communication, and can access and view the posted documents via the invitee's computing device by "clicking-on" icons for the posted documents displayed in the meeting notice. Upon such selection of the icons for the posted documents, the host's server downloads the selected documents to the invitee's computer via a network determined by the host's server. During a typical teleconference, the host typically presents orally the material displayed in the posted documents and orally notifies the invitees as to which document and page(s) to view, but invitees controls what documents and pages of the document to view on the screens of their computing devices.

The computing devices can be mobile or stationary, and the telephone and computing device can be integrated together. The telephone can be a conventional "plain old telephone system ("POTS") or a Voice over Internet Protocol system. Examples of known mobile computers are smart phones, personal digital assistants (PDAs) and computer tablets, where some of these devices include integrated telephone capability. Examples of known stationary computing devices are desk top computers and other workstations.

It was known for the telephone call of the teleconference to occur through a Voice over Internet Protocol network. In some instances the same communications network provides connectivity for the transfer of both the telephone conference call and the sending and receiving of data related to the presentation materials. However, in other instances, the teleconferencing sessions occur through different networks. In the situation where multiple networks are used, typically the audio portion of the session is carried by a separate network than the network that supports the delivery of the documents related to the teleconference.

During known teleconferences, a problem occasionally occurs where the invitee calls-in to the teleconference call, via a telephone, but cannot access the posted documents by "clicking-on" the documents' icons for the posted documents due to failure of the designated network used to send the documents to the computing device of the invitee.

An object of the present invention is to provide the documents to an invitee of a teleconference when the invitee can call-in to the teleconference call, but cannot access the documents by clicking on the icons for the posted documents.

SUMMARY

Aspects of the present invention disclose a method, computer system, and computer program product for delivery of presentation materials to invitees of a teleconference.

A system, method and program product for delivering to an invitee of a teleconference an electronic file attached to or referenced by a teleconference meeting notice for the teleconference. The teleconference hosted by a server computer, the invitee has a telephone to call-in to the teleconference via a telephone connection, and an invitee's computer downloads the electronic file from the server computer via a first network in response to selection by the invitee of a representation of the electronic file from the meeting notice. The server computer receives a notification that a predetermined combination of keys has been pressed by the invitee on the telephone. In response, the server computer determines an e-mail address or instant message address for the invitee. The server computer attaches the electronic file to an e-mail or instant message and sending the e-mail or instant message with the attached electronic file to the e-mail address or instant message address.

DETAILED DESCRIPTION

The present invention will now be described in detail with reference to the figures.

Figure 1:
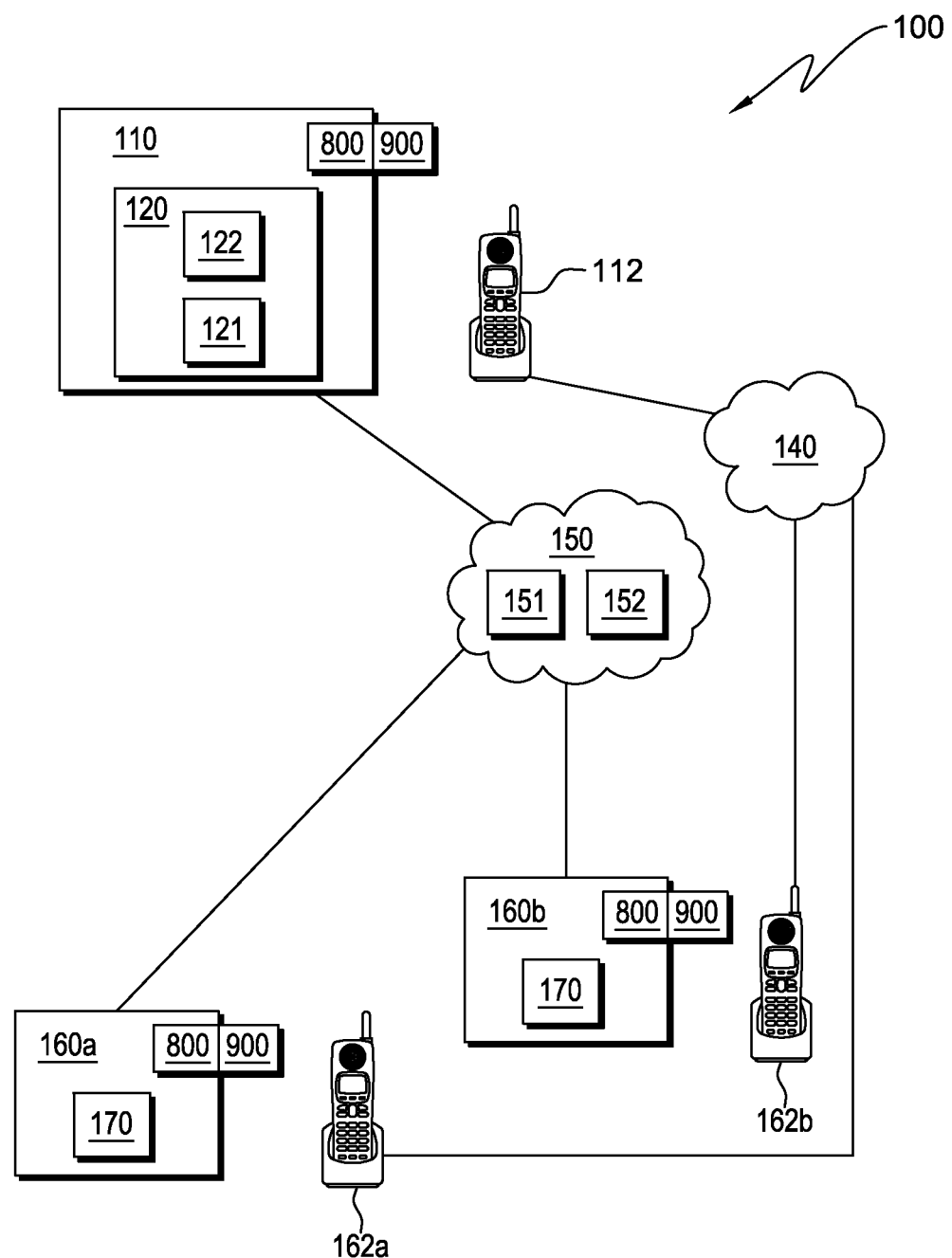
FIG. 1 depicts a presentation material managing retrieval system according to an embodiment of the present invention for managing the retrieval of presentation materials with a communication device coupled to a network during a teleconference.

FIG. 1 illustrates as teleconferencing system generally designated 100 according to one embodiment of the present invention.

System 100 includes a host computer 110 and host telephone 112 and multiple invitee computers 160*a,b* each with a respective invitee telephone 162a,b for a respective user (not shown). The host computer 110 includes an audio/visual teleconference meeting host program 120 with a scheduling program function 121 which allows a host (person) to schedule a meeting by selecting invitees and a date and time for the meeting, and posting an electronic document in a meeting notice (or elsewhere available to the invitees) sent to the invitees. Every invitee computer includes a teleconferencing invitee program 170 which allows each invitee to accept or reject the meeting, and after acceptance, select the posted document to download the document to the invitee computer 160 (for example, by clicking-on an icon for the document posted in the meeting notice) and open and page through the document at will. At the scheduled time for the meeting, the host and invitees call-in to a telephone conference number listed in the meeting notice through which they all can communicate. Typically, the host leads the discussion and references different pages in the document at different points in the discussion. In the illustrated embodiment, the telephone communication between the host and the invitees occurs via a telephony network 140, and the documents are downloaded to the invitees via a digital network 150 upon selection of the posted document. Occasionally, the digital network 150 is unavailable either due to failure, overload, latency problems, or binding of traffic at ports, and one or more invitees cannot download the document selected directly from the meeting notice via the digital network 150 or one or more invitees choose not to download the document directly via the meeting notice.

In such a case, according to the present invention, the invitee presses a predetermined sequence of characters on his her invitee telephone 162 used for the conference call. The invitee's telephone 162 is coupled to the teleconference host program 120 via the networks 140 and 150. A retrieve program function 122 in the teleconference host program 120 recognizes the predetermined sequence of characters as a request for the document via an e-mail and also recognizes the associated telephone number. In response, the retrieve program function 122 accesses a configuration file or telephone/e-mail directory for employees (including the meeting invitees) of a corporation which lists the e-mail address for the telephone number, attaches the document to an e-mail and sends the e-mail to the e-mail address listed in the configuration file. Typically, the e-mail traverses an alternative network path 152 than for the direct download of the document selected via the meeting notice. (The teleconference host program 120 previously acquired the configuration information from the telephone directory or by prior registration of the invitees with the teleconference host program 120.) The invitee receives the e-mail and opens the document attached to the e-mail. Thus, the invitee obtains the document even though the network path 151 for direct download of the document via the meeting notice was not available or the invitee chose not to download the document selected via the meeting notice.

Any number of invitee preferences may be stored for the alternative manner of receiving the posted document. In one example, associated with a telephone number is data for a user name, web address, e-mail address, chat tool user identification, such as Lotus Sametime®, an option for how the invitee prefers data for presentation files to be sent to computer or device, a mode for how the invitee prefers data for presentation files to be sent to computer or device, a format for how the invitee prefers data for presentation files to be sent to computer or device, etc.

There are many different possible modes for how the invitee can register to receive the posted documents from server computer 110 to computer 160 when unavailable by selecting the icon for the posted document. In other examples, the mode may be multimedia messaging services (MMS), short message service (SMS), instant messaging, videotelephony, or any other form of possible communication.

Furthermore, the invitee may be able to select and store in a database (not shown) or other location, a format for how the invitee prefers the posted documents to be sent to the invitee's computing device through a default or alternative network path 151 and 152. In some examples, the format may be a Microsoft Office PowerPoint presentation, .pdf, .gif, .jpg, .png, etc. In some cases the invitee has a default setting of preferred format of delivery for any chosen computer 160 used. For example, an invitee data for presentation files sent over an alternate network 150 to the computer 160 is delivered in PowerPoint format for an e-mail, or in the alternative in .jpeg format for a different device, such as a smartphone.

Many different options for how the invitee prefers data for presentation files to be sent to computer 160 through a default or alternative network path 151 and 152 may be used. In one example, the option is to send the user the current screen discussed during the teleconference. Another option may be to send a range of pages of the teleconference presentation file. The entire teleconference presentation file may be sent in another embodiment. Furthermore, in some scenarios, an option is to send all presentation files stored on a server computer 110 may be sent to a user if multiple teleconference files are uploaded for the entire teleconference. Other forms of options may be used, depending on the desired characteristics of the users.

In some instances, the user selects an option, mode and/or format where computer 160 does not have the capability to open and display the data of the presentation file sent by the server computer 110. In this scenario, the computer 160 alerts the invitee with an error message and/or suggests what formats are compatible with their computer 160. The invitee chooses another format option, mode, and/or format for their computer when an error message appears.

In an alternative embodiment, the invitee has the option to override their preselected preferences. In one scenario, the computer 110 prompts and/or allows the invitee with the option to use preselected preferences or to input new preferences when signing up for the teleconference. This may be beneficial because the invitee may not have accessibility to their preselected computer 160 when traveling, or the invitee may not actually be the owner of the device where the preferences are saved.

In some scenarios, more than one number from more than one computer 160 may be associated to a single invitee and/or the invitee data and preferences. In one example, an invitee has both a mobile number and a land-line office number. If the invitee calls from either the mobile or office number and requests that data of presentation file be sent, the program 120 sends the presentation file according to the same invitee data and preferences.

When signing up for the teleconference, the teleconference program 120 provides the invitee with a sign up notice that provides instructions on how the invitee retrieves the data of the presentation materials if connectivity is lost from the server computer 110 to computer 160 through the default network path 151. The instructions include a number and/or symbol combination to press the keypad (not shown) of their telephone 162a,b to provide the connectivity through an alternative network path 152 by the server computer 110. In one example, the invitee dials (*123) on the keypad of their telephone 162a,b. Typically, but not necessarily, the number and/or symbol combination used is not too simplistic to avoid inadvertent dialing of the number when the user is participating in the teleconference. In one example, the sign up notice provided in conjunction with the teleconference is provided to the invitee at multiple different times, including the initial sign-up for the presentation, when the invitee signs into the teleconference, once the teleconference begins, during the teleconference, etc.

Figure 2:
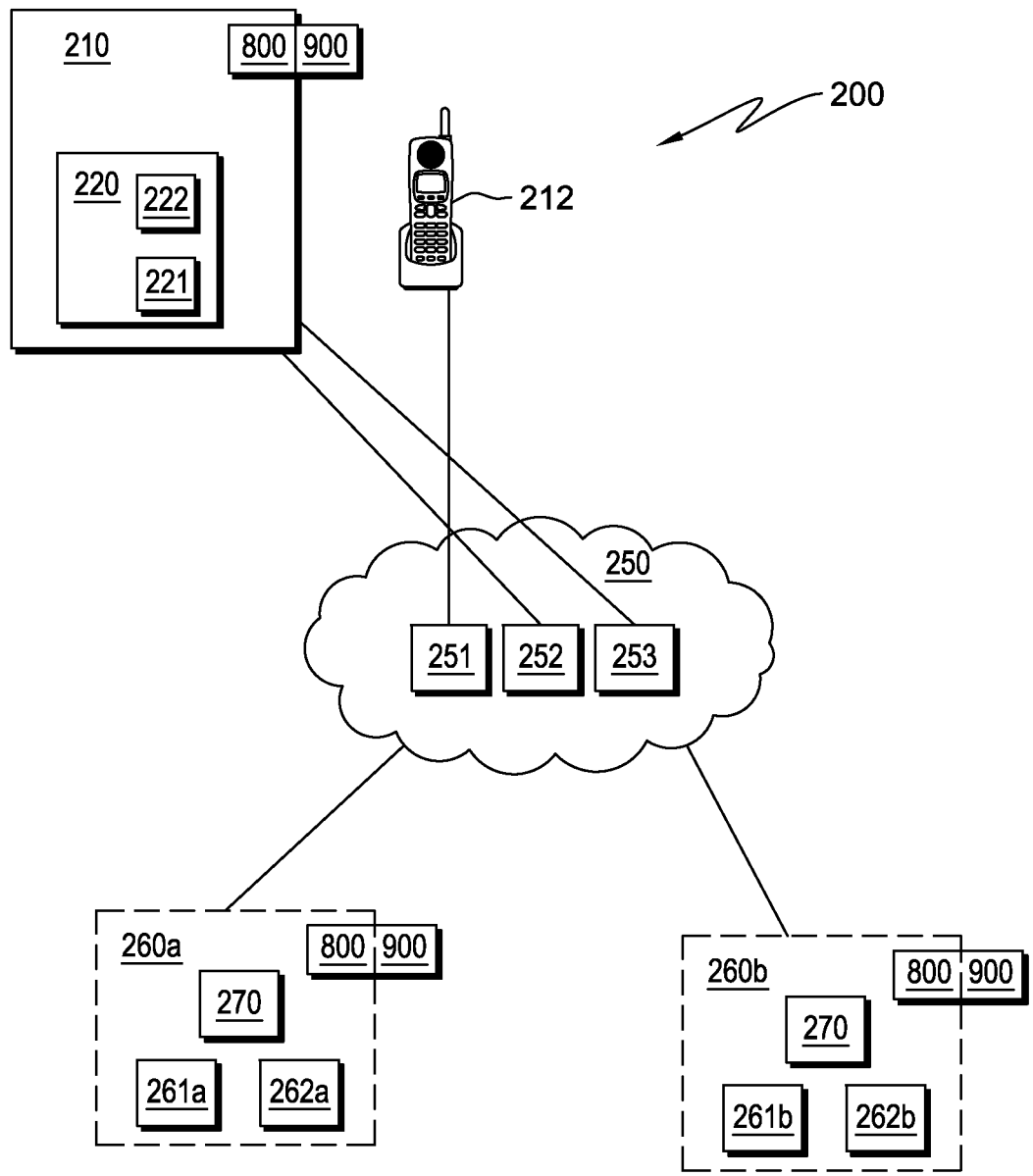
FIG. 2 depicts a presentation material managing retrieval system according to another embodiment of the present invention for managing the retrieval of presentation materials with a communication device coupled to a network during a teleconference.

Alternatively, FIG. 2 illustrates a teleconferencing system generally designated 200 according to one embodiment of the present invention.

System 200 includes a host computer 210 and host telephone 212 and multiple invitee mobile devices 260a,b. Each mobile device is capable of performing computing functions, along with support telephony functions. The host computer 210 includes an audio/visual teleconference meeting host program 220 with a scheduling program function 221 which allows a host (person) to schedule a meeting by selecting invitees and a date and time for the meeting, and posting an electronic document in a meeting notice (or elsewhere available to the invitees) sent to the invitees. Invitees' mobile devices include a teleconferencing invitee program 270 which allows them to accept or reject the meeting, and after acceptance, to select the posted document to download to their mobile device 260 and to open the document at will. At the scheduled time for the meeting, the host and invitees call-in to a telephone conference number listed in the meeting notice through which they all can communicate. Typically, the host leads the discussion and references different pages in the document at different points in the discussion. Invitees can view the documents they previously downloaded. In the illustrated embodiment, the telephone communication between the host and the invitees occurs via a first path 251 of a digital network 250, and the documents are downloaded to the invitees, via a second path 252 of the digital network 250. Occasionally, the second path 252 of the digital network 250 is unavailable either due to failure, overload, latency problems, or binding of traffic at ports, and one or more invitees cannot download the document directly from the meeting notice via the digital network 250.

In such a case, according to the present invention, the invitee presses a predetermined sequence of characters on his or her mobile device 260 that is used for the conference call. The invitee's mobile device 260 is coupled to the teleconference host program 220 via the digital network 250. A retrieve program function 222 in the teleconference host program 220 recognizes the predetermined sequence of characters as a request for the document via a MMS and also recognizes the associated telephone number. In response, the retrieve program function 222 accesses a configuration file which lists the telephone number, and sends the MMS to the telephone number to the e-mail address listed in the configuration file. Typically, the MMS traverses the third network path 253. (The teleconference host program 220 previously acquired the configuration information from a telephone directory or by prior registration of the invitee with the teleconference host program 220.) The invitee receives the MMS and opens MMS. Thus, the invitee obtains the presentation information even though the second network path 252 for direct download of the document via the meeting notice was not available or the invitee chooses not to download the document via the meeting notice.

In some examples, the mobile device 260 for computing and/or communicating with server computer 210 may be, for example, the invitee's computer system such as a personal computer, a notebook, a netbook, a laptop computer, a tablet computer, a handheld device or smart-phone, a thin client, or any other electronic device or computing system capable of communicating with a system 200, such as server computer 210, through a network. For example, the device 260 may include devices such as a personal computer (e.g., desktop, laptop, palm, tablet, etc.) or a handheld device (e.g., cellular telephone, smart-phone, personal digital assistant (PDA), e-mail device, music recording or playback device, etc.), or any other device capable of processing information.

Figure 3:
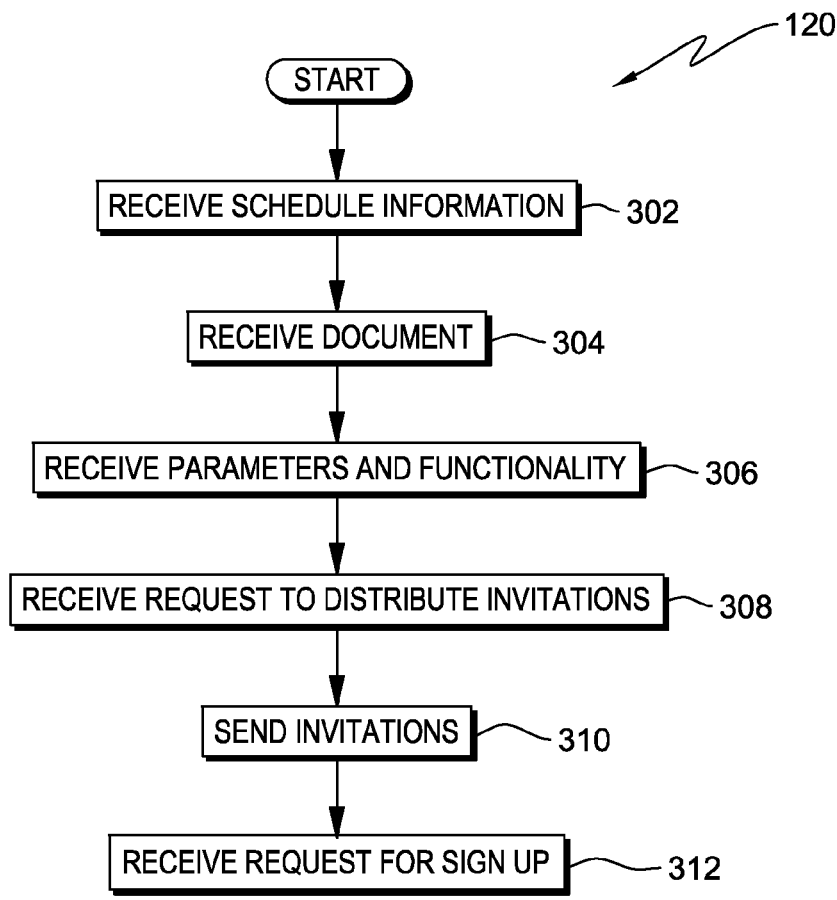
FIG. 3 is a flow chart illustrating the steps of a program installed in a computer of FIG. 1 for operating a teleconference.

FIG. 3 is a flow chart of the teleconferencing host program 120. In Step 302, the teleconferencing host program 120 receives schedule information from the host (person), such as time and date, length of teleconference, sign-in information, etc. The scheduling function 121 can be the prior art scheduling function found in IBM Sametime® where the host (person) selects the date, time, and invitees, and the teleconferencing host program 120 obtains the contact information for the invitees from a prior art directory such as a user profile in a company's intranet system. In step 304, the teleconference program 120 receives from the host via a network a document to post in the meeting notice. The document can be a word processor type file, a video file, presentation slides, links to web tours, polls and surveys, etc. During, before and after the teleconference, the documents are accessible by the users. In step 306, the teleconference program receives documents from the host's computer via a network of the foregoing parameters and functionality of the teleconference. In some scenarios, the host may select the invitees that are able to access the teleconference. In step 308, the teleconference program receives from the host via a network a request to distribute invitations to potential invitees through e-mail, MMS, SMS, or other types of communication. In response to the request to distribute invitations, in step 310 the teleconference program sends out invitations through e-mail, MMS, SMS, or forms of communication.

After the teleconference has been scheduled, in step 312 the teleconference program 170 of the invitees receives a request for the invitee to sign up for the teleconference. The invitees may have individual accounts and/or profiles, such as a company profile linked with a program suite, which store their desired preferences.

Once the desired date and time has arrived, in step 330, the server computer 110 starts the teleconference session according to known procedures. In step 332, the server computer 110 connects through a digital network 150 to one or more invitee computers 160 of invitees. In step 334, the server computer 110 receives a request from the host inputting a number on the keypad of the host telephone 112 to connect with the teleconference through a telephony network 140. In step 336, the server computer 110 receives a request from the invitee inputting a number on the keypad of the invitee telephone 162a,b to connect with the teleconference through a telephony network 140.

Figure 4:
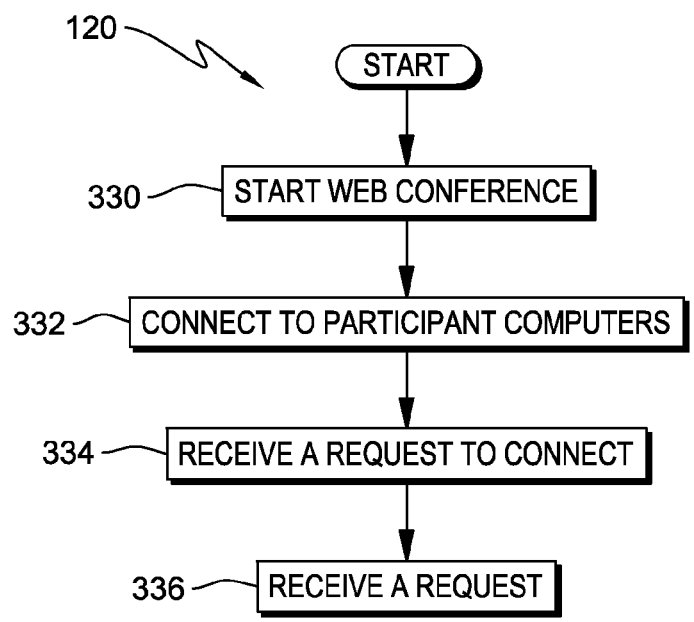
FIG. 4 is a flow chart illustrating the steps of a program installed in the computer of FIG. 1 for operating a teleconference.
Figure 5:
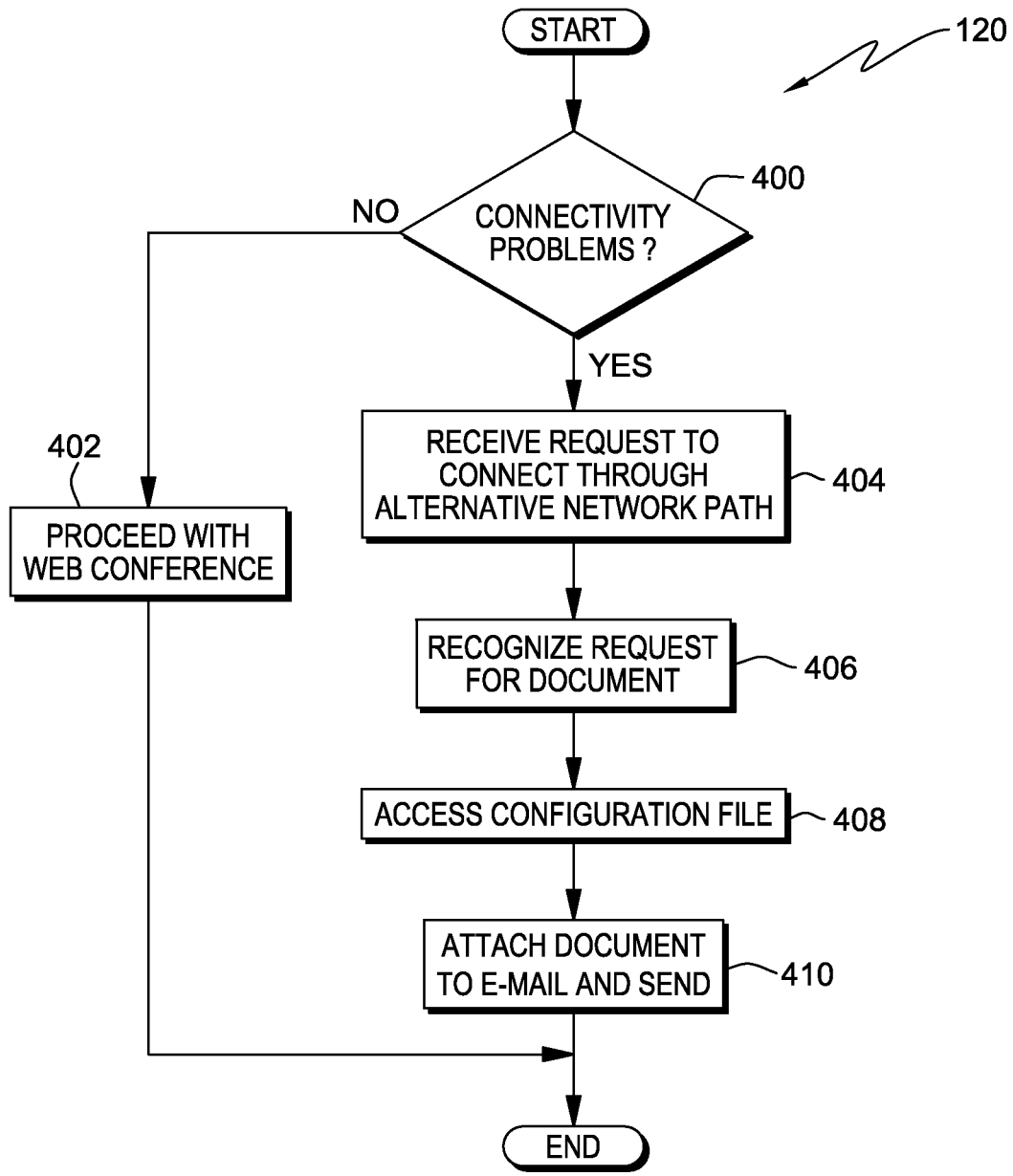
FIG. 5 is a flow chart illustrating the steps of a program installed in the computer of FIG. 1 for retrieving data related to presentation materials to a device coupled to one or more networks during a teleconference.

FIG. 4 is a flowchart of an embodiment of a retrieving program function 120 for retrieving teleconference presentation files for a user and delivers data over an alternative network path 151 to an invitee computer 160.

Once the teleconference has begun, the invitee decides if the computer 160 has sufficient connectivity through the default network 140 to the server computer 110 so that the invitee can download and view the presentation materials used in the teleconference on the computer 160. If the invitee finds that the connectivity of the computer 160 to the server computer 110 is sufficient through the first path 151 of the digital network 150, in step 402, the server computer 110 proceeds sending the presentation of the teleconference materials on device 160 through the first path 151.

However, sometimes when connecting to a teleconference or when the teleconference is running, a mobile or stationary invitee loses connection through the first path 151 of the digital network, and no longer has access to the presentation materials of the teleconference. Although the teleconference is typically set-up to operate in a traditional fashion, there may be an alternative path 152 of the digital network 150 connected to the server computer 110 to send data of the presentation files to computer 160 of users who lose connectivity through the first path 151 of the digital network 150.

When the invitee of computer 160 finds that connectivity to the server computer 110 through the first path 151 is disrupted or limited, in step 404, the server computer receives a request from the invitee to connect computer 160 to the server computer 110 through an alternative path 152 of the digital network 150. The invitee's telephone 162 is coupled to the teleconference host program 120 via the networks 140 and 150. In step 406, the computer recognizes the predetermined sequence of characters as a request for the document via an e-mail and also recognizes the associated telephone number. In step 408, in response, the computer accesses a configuration file which lists the e-mail address for the telephone number. In step 410, the computer attaches the document to an e-mail and sends the e-mail to the e-mail address listed in the configuration file through an alternative path 152 of the digital network.

Figure 6:
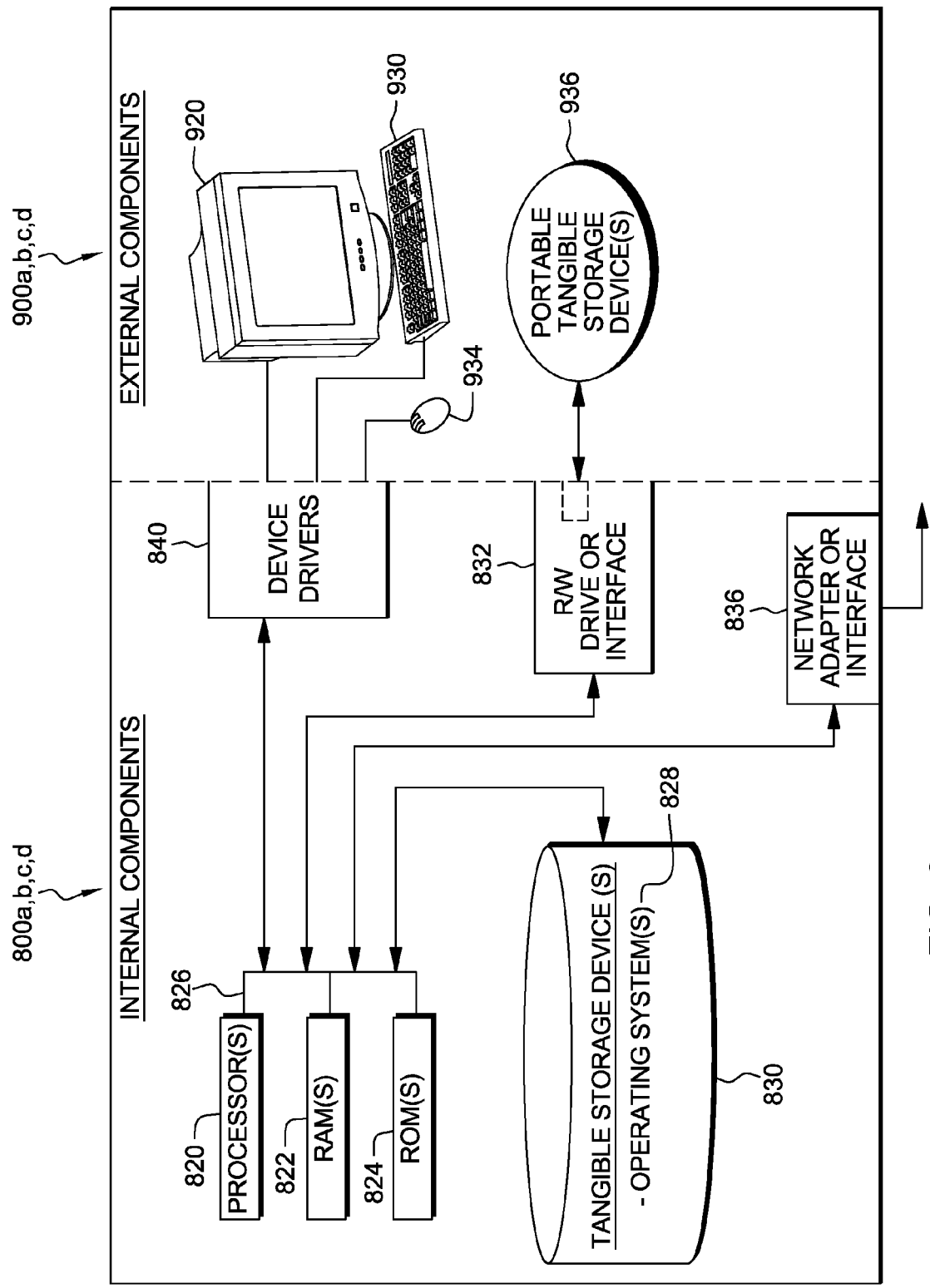
FIG. 6 is a block diagram of components of computers of FIGS. 1 and 2 (such as a mobile device, electronic device, or server computer) depicted in accordance with an illustrative embodiment.

Computers 110 and 160 and device 260 may include respective sets of internal components 800a,b,c,d and external components 900a,b,c,d illustrated in FIG. 6. Each of the sets of internal components 800a,b,c,d includes one or more processors 820, one or more computer-readable RAMs 822 and one or more computer-readable ROMs 824 on one or more buses 826, and one or more operating systems 828 and one or more computer-readable storage devices 830. The one or more operating systems 828 and programs 120, 170, 220 and 270 (in computers 110 and/or 160 and/or device 260) are stored on one or more of the respective computer-readable storage devices 830 for execution by one or more of the respective processors 820 via one or more of the respective RAMs 822 (which typically include cache memory). In the embodiment illustrated in FIG. 6, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

Each set of internal components 800a,b,c,d also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. The programs 120, 170, 220 and 270 (in computers 110 and/or computer 160 and/or device 260) can be stored on one or more of the respective portable computer-readable storage devices 936, read via the respective R/W drive or interface 832 and loaded into the respective hard drive 830. The term "computer-readable storage device" does not encompass signal propagation media such as cooper cables, optical fibers, and wireless transmission media.

Each set of internal components 800a,b,c,d also includes a network adapter or interface 836 such as a TCP/IP adapter card. The programs 120, 170, 220 and 270 can be downloaded to respective computer 110 and/or computer 160 and/or device 260, from an external computer via a network (for example, the Internet, a local area network or other, wide area network) and respective network adapter or interface 836. From the network adapter or interface 836, the programs 120, 170, 220 and 270 are loaded into the respective hard drive 830. The network may comprise copper wires, optical fibers, wireless transmission, routers, firewalls, switches, gateway computers and/or edge servers.

Each of the sets of external components 900a,b,c,d includes a computer display monitor 920, a keyboard 930, and a computer mouse 934. Each of the sets of internal components 800a,b,c,d also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Programs 120, 170, 220 and 270 can be written in various programming languages (such as Java, C+, etc.) including low-level, high-level, object-oriented or non object-oriented languages. Alternatively, the functions of programs 120, 170, 220 and 270 can be implemented in whole or in part by computer circuits and other hardware (not shown).

Based on the foregoing, computer system, method and program product have been disclosed for retrieving a presentation materials to a communication device coupled to one or more networks during a teleconference. However, numerous modifications and substitutions can be made without deviating from the scope of the present invention. Therefore, the present invention has been disclosed by way of example and not limitation.

What is claimed is:

1. A method for delivering to an invitee of a teleconference an electronic file attached to or referenced by a meeting notice for the teleconference, the teleconference hosted by a server computer, the invitee having a telephone to call-in to the teleconference via a telephone connection, and the invitee having an invitee computer to download the electronic file from the server computer via a first network in response to selection by the invitee of a representation of the electronic file from the meeting notice, the method comprising the steps of:

the server computer receiving a notification that a predetermined combination of keys has been pressed by the invitee on the telephone;

in response, the server computer determining an e-mail address or instant message address for the invitee, and the server computer attaching the electronic file to an e-mail or instant message and sending the e-mail or instant message with the attached electronic file to the e-mail address.

2. The method of claim 1 wherein the server computer sends the e-mail or instant message to the invitee via a second network different than the first network.

3. The method of claim 1 wherein the server computer is coupled to the telephone to detect the combination of keys pressed by the invitee on the telephone.

4. The method of claim 1 wherein the server computer sends the e-mail or instant message to the invitee via a second path in the first network.

5. The method of claim 1 wherein the telephone and the invitee's computer are a single device.

6. The method of claim 1 wherein the electronic file comprises at least one of: a range of pages but not all pages of the teleconference presentation file, an entire teleconference presentation file, all presentation files stored on the server computer associated with the meeting notice, or the current screen discussed during the teleconference.

7. A computer program product for delivering to an invitee of a teleconference an electronic file attached to or referenced by a meeting notice for the teleconference, the teleconference hosted by a server computer, the invitee having a telephone to call-in to the teleconference via a telephone connection, and the invitee having an invitee computer to download the electronic file from the server computer via a first network in response to selection by the invitee of a representation of the electronic file from the meeting notice, the computer program product comprising:

one or more computer-readable storage devices and program instructions stored on at least one of the one or more storage devices, the program instructions comprising;

program instructions to receive a notification that a predetermined combination of keys has been pressed by the invitee on the telephone; and program instructions, responsive to the notification that a predetermined combination of keys has been pressed, to determine an e-mail address for the invitee, and to attach the electronic file to an e-mail and to send the e-mail with the attached electronic file to the e-mail address.

8. The computer program product of claim 7 wherein the server computer sends the e-mail to the invitee via a second network different than the first network.

9. The computer program product of claim 7 wherein the server computer is coupled to the telephone to detect the combination of keys pressed by the invitee on the telephone.

10. The computer program product of claim 7 wherein the server computer sends the e-mail to the invitee via a second path in the first network.

11. The computer program product of claim 7 wherein the telephone and the invitee computer are a single device.

12. The computer program product of claim 7 wherein the electronic file comprises at least one of: a range of pages but not all pages of the teleconference presentation file, an entire teleconference presentation file, all presentation files stored on the server computer associated with the meeting notice, or the current screen discussed during the teleconference.

13. A computer program product for delivering to an invitee of a teleconference an electronic file attached to or referenced by a meeting notice for the teleconference, the teleconference hosted by a server computer, the invitee having a telephone to call-in to the teleconference via a telephone connection, and the invitee having an invitee computer to download the electronic file from the server computer via a first network in response to selection by the invitee of a representation of the electronic file from the meeting notice, the computer program product comprising:

one or more computer-readable storage devices and program instructions stored on at least one of the one or more storage devices, the program instructions comprising;

program instructions to receive a notification that a predetermined combination of keys has been pressed by the invitee on the telephone; and program instructions, responsive to the notification that a predetermined combination of keys has been pressed, to determine an instant message address for the invitee, and to attach the electronic file to an instant message and to send the instant message with the attached electronic file to the instant message address.

14. The computer program product of claim 13 wherein the server computer sends the instant message to the invitee via a second network different than the first network.

15. The computer program product of claim 13 wherein the server computer is coupled to the telephone to detect the combination of keys pressed by the invitee on the telephone.

16. The computer program product of claim 13 wherein the server computer sends the instant message to the invitee via a second path in the first network.

17. The computer program product of claim 13 wherein the telephone and the invitee computer are a single device.

18. The computer program product of claim 13 wherein the electronic file comprises at least one of: a range of pages but not all pages of the teleconference presentation file, an entire teleconference presentation file, all presentation files stored on the server computer associated with the meeting notice, or the current screen discussed during the teleconference.

\* \* \* \* \*